(12) United States Patent
Polacek (10) Patent No.: US 10,089,309 B2
(45) Date of Patent: Oct. 2, 2018

(54) SYSTEM AND METHOD FOR LOAD BALANCING BASED ON EXPECTED LATENCY FOR USE IN MEDIA CONTENT OR OTHER ENVIRONMENTS

(71) Applicant: SPOTIFY AB, Stockholm (SE)

(72) Inventor: Lukas Polacek, Stockholm (SE)

(73) Assignee: SPOTIFY AB, Stockholm (SE)

( * ) Notice: Subject to any disclaimer, the term of this patent is extended or adjusted under 35 U.S.C. 154(b) by 92 days.

(21) Appl. No.: 15/017,392

(22) Filed: Feb. 5, 2016

(65) Prior Publication Data

US 2017/0230295 A1    Aug. 10, 2017

(51) Int. Cl.
| | | |
|---|---|---|
| G06F 15/173 | (2006.01) | |
| G06F 17/30 | (2006.01) | |
| H04L 29/08 | (2006.01) | |
| H04L 12/875 | (2013.01) | |

(52) U.S. Cl.
CPC .. G06F 17/30017 (2013.01); G06F 17/30023 (2013.01); H04L 47/56 (2013.01); H04L 67/00 (2013.01)

(58) Field of Classification Search
CPC .......................... H04L 47/125; G06F 17/30017
See application file for complete search history.

(56) References Cited

U.S. PATENT DOCUMENTS

| | | | |
|---|---|---|---|
| 9,311,066 B1 * | 4/2016 | Garman ................ G06F 8/60 | |
| 2002/0083124 A1 * | 6/2002 | Knox ............... G06F 17/30067 | 709/203 |
| 2008/0168044 A1 * | 7/2008 | Barron ................ G06F 11/3419 | |
| 2008/0189429 A1 * | 8/2008 | DaCosta ........... H04L 29/06027 | 709/231 |
| 2009/0215540 A1 * | 8/2009 | Perlman .................. A63F 13/12 | 463/42 |
| 2012/0151043 A1 * | 6/2012 | Venkataraman ...... H04L 43/045 | 709/224 |

(Continued)

OTHER PUBLICATIONS

"C3: Cutting Tail Latency in Cloud Data Stores via Adaptive Replica Selection" by Lalith Suresh, Marco Canini, Stefan Schmid, and Anja Feldmann; Proceedings of the 12th USENIX Symposium on Networked Systems Design and Implementation (NSDI '15); USENIX Association; 513-537.

(Continued)

Primary Examiner — Jonathan A Bui
(74) Attorney, Agent, or Firm — Tucker Ellis LLP (57) ABSTRACT

In accordance with an embodiment, described herein is a system and method for load balancing of requests to servers based on expected latency, for use in the providing of media content or other types of data. The system comprises an access point, or other process or component, which operates as a load balancer in providing access to one or more servers, for use in processing requests at those servers. Each of the servers can be associated with an endpoint. An expected latency selection component can be used by the access point to determine how requests are distributed or load balanced to servers, based on a determination of expected latency at those servers. Upon the access point receiving a particular request, the determination of expected latency can be used to determine which endpoint or server to direct that particular request.

17 Claims, 10 Drawing Sheets

(56) References Cited

U.S. PATENT DOCUMENTS

| | | | | |
|---|---|---|---|---|
| 2013/0254261 A1* | 9/2013 | Nicholls | ............... | G06F 9/5027 709/203 |
| 2013/0345841 A1* | 12/2013 | Garcia | ............... | H04N 21/6377 700/94 |
| 2014/0108671 A1* | 4/2014 | Watson | ............... | H04L 65/4084 709/231 |
| 2015/0098333 A1* | 4/2015 | Lin | ....................... | H04L 67/101 370/235 |
| 2015/0256613 A1* | 9/2015 | Walker | ................... | H04L 67/32 709/217 |
| 2016/0182399 A1* | 6/2016 | Zadka | ................... | H04L 47/783 709/226 |
| 2016/0248474 A1* | 8/2016 | Gilson | ..................... | H04B 3/06 |
| 2016/0337426 A1* | 11/2016 | Shribman | ............ | H04L 65/4084 |
| 2017/0201571 A1* | 7/2017 | Sherf | ................. | H04L 67/1008 |

OTHER PUBLICATIONS

"Forward Decay: A Practical Time Decay Model for Streaming Systems" by Graham Cormode, Vladislav Shkapenyuk, Divesh Srivastava, and Bojian Xu; Proceedings of the 2009 IEEE International Conference on Data Engineering (ICDE 09); IEEE Computer Society, Washington, DC, USA; 138-149.

\* cited by examiner

SYSTEM AND METHOD FOR LOAD BALANCING BASED ON EXPECTED LATENCY FOR USE IN MEDIA CONTENT OR OTHER ENVIRONMENTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to the providing of media content, or other types of data, and are particularly related to a system and method for load balancing of requests to servers based on expected latency.

BACKGROUND

Today's consumers enjoy the ability to access a tremendous amount of media content, such as music and videos, at any location or time of day, using a wide variety of media devices. Computer systems such as media servers, which process requests using a large number of servers and/or provide content to a large number of clients, generally rely on the ability to distribute or load balance those requests based on the availability of particular servers, or the needs of particular clients. However, some traditional approaches to load balancing may provide inconsistent results. These are some examples of the types of environments in which embodiments of the invention can be used.

SUMMARY

In accordance with an embodiment, described herein is a system and method for load balancing of requests to servers based on expected latency, for use in the providing of media content or other types of data. The system comprises an access point, or other process or component, which operates as a load balancer in providing access to one or more servers, for use in processing requests at those servers. Each of the servers can be associated with an endpoint. An expected latency selection component can be used by the access point to determine how requests are distributed or load balanced to servers, based on a determination of expected latency at those servers. Upon the access point receiving a particular request, the determination of expected latency can be used to determine which endpoint or server to direct that particular request.

DETAILED DESCRIPTION

As described above, computer systems such as media servers, which process requests using a large number of servers and/or provide content to a large number of clients, generally rely on the ability to distribute or load balance those requests based on the availability of particular servers, or the needs of particular clients.

In accordance with an embodiment, described herein is a system and method for load balancing of requests to servers based on expected latency, for use in the providing of media content or other types of data. The system comprises an access point, or other process or component, which operates as a load balancer in providing access to one or more servers, for use in processing requests at those servers. Each of the servers can be associated with an endpoint. An expected latency selection component can be used by the access point to determine how requests are distributed or load balanced to servers, based on a determination of expected latency at those servers. Upon the access point receiving a particular request, the determination of expected latency can be used to determine which endpoint or server to direct that particular request.

In accordance with an embodiment, the system comprises a computer including a processor and memory; an access point, or other process or component, which operates as a load balancer in providing access to one or more servers, for use in processing requests at those servers; an expected latency selection component, that is used by the access point, or other process or component, to determine how requests are distributed or load balanced to servers, based on a determination of expected latency at those servers; wherein each of a plurality of servers is associated with an endpoint at which that server receives requests from the access point; and whereupon the access point receiving a particular request for data, the determination of expected latency is used to determine which endpoint to direct that particular request.

In accordance with an embodiment, the system comprises a media server, wherein the access point, or other process or component is configured to receive media-access requests from a client device, which identifies a destination client device to which the media server should stream or otherwise provide media content, in response to processing the media-access request.

In accordance with an embodiment, each of the plurality of servers is one of a media content metadata server, or a proxy media content metadata server, for use in streaming or otherwise providing the media content to the destination client device.

In accordance with an embodiment, the expected latency selection component measures, for each of the plurality of servers able to receive requests from the access point, a data indicative of success latency and success rate for that server, an indication of an amount of outstanding requests sent from the access point and that server, and a data indicative of failure latency for that server, which are then used in the determination of expected latency.

In accordance with an embodiment, a data indicative of failure roundtrip time is additionally used by the expected latency selection component in the determination of expected latency.

The above and additional embodiments are described in further detail below.

Media Content Environment

Figure 1:
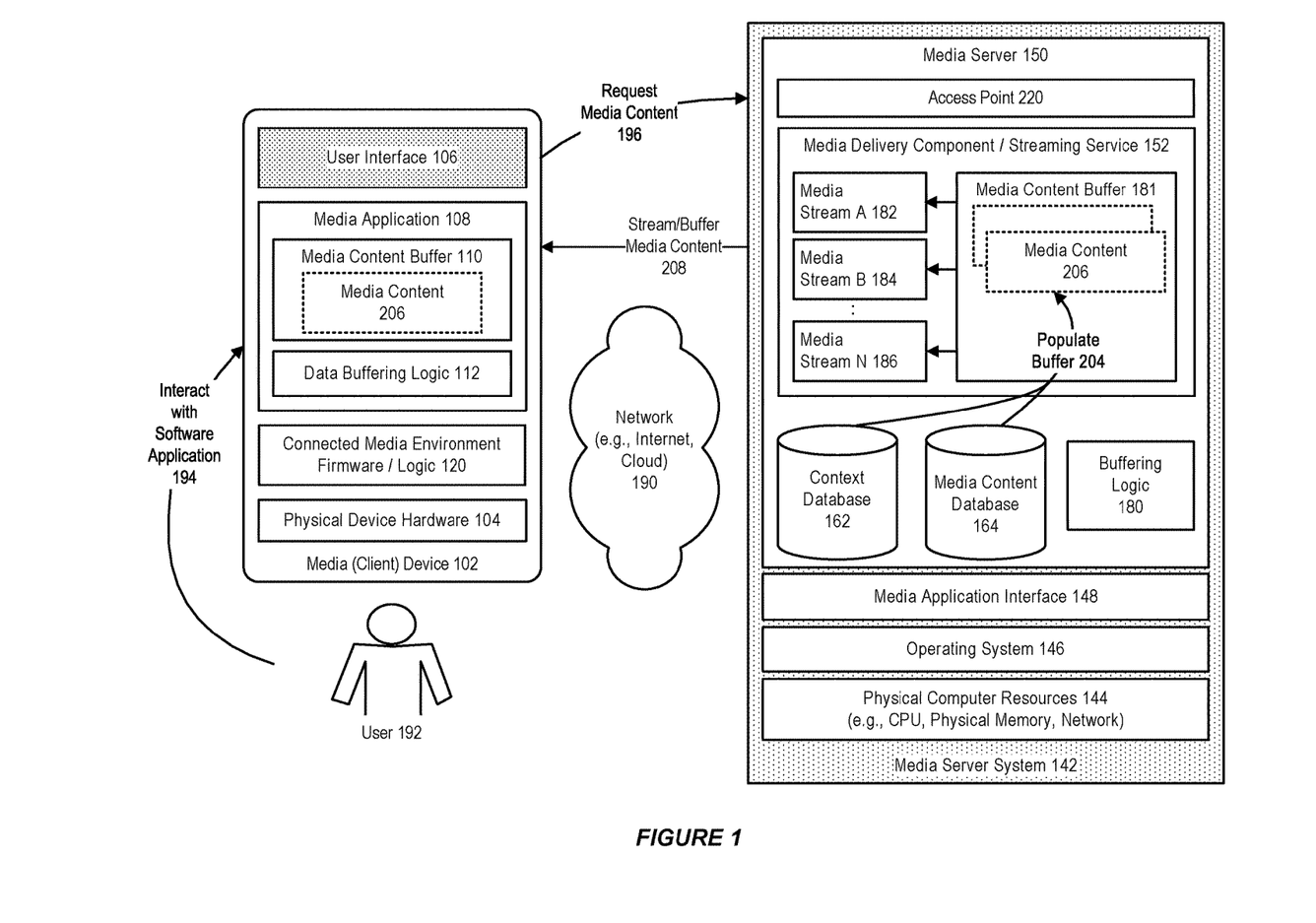
FIG. 1 illustrates an example of a system for providing media content, in accordance with an embodiment.

FIG. 1 illustrates an example of a system for providing media content, in accordance with an embodiment.

As illustrated in FIG. 1, in accordance with an embodiment, a media device 102, operating as a client device, can receive and play media content provided by a backend media server system 142 (media server), or by another system or peer device. In accordance with an embodiment, the client device can be, for example, a personal computer system, handheld entertainment device, tablet device, smartphone, television, audio speaker, in-car entertainment system, or other type of electronic or media device that is adapted or able to prepare a media content for presentation, control the presentation of media content, and/or play or otherwise present media content.

In accordance with an embodiment, each of the client device and the media server can include, respectively, one or more physical device or computer hardware resources 104, 144, such as one or more processors (CPU), physical memory, network components, or other types of hardware resources.

Although, for purposes of illustration, a single client device and media server are shown, in accordance with an embodiment a media server can support the simultaneous use of a plurality of client devices. Similarly, in accordance with an embodiment, a client device can access media content provided by a plurality of media servers, or switch between different media streams produced by one or more media servers.

In accordance with an embodiment, the client device can optionally include a user interface 106, which is adapted to display media options, for example as an array of media tiles, thumbnails, or other format, and to determine a user interaction or input. Selecting a particular media option, for example a particular media tile or thumbnail, can be used as a command by a user and/or the client device, to the media server, to download, stream or otherwise access a corresponding particular media content item or stream of media content.

In accordance with an embodiment, the client device can also include a media application 108, together with an in-memory client-side media content buffer 110, and a data buffering logic 112, which can be used to control the playback of media content received from the media server, for playing either at a requesting client device (i.e., controlling device) or at a controlled client device (i.e., controlled device), in the manner of a remote control. A connected media environment firmware/logic 120 enables the device to participate within a connected media environment.

In accordance with an embodiment, the data buffering logic, together with the media content buffer, enables a portion of media content items, or samples thereof, to be pre-buffered at a client device. For example, while media options are being prepared for display on a user interface, e.g., as media tiles or thumbnails, their related media content can be pre-buffered at the same time, and cached by one or more client devices in their media content buffers, for prompt and efficient playback when required.

In accordance with an embodiment, the media server system can include an operating system 146 or other processing environment which supports execution of a media server 150 that can be used, for example, to stream music, video, or other forms of media content to a client device, or to a controlled device.

In accordance with an embodiment, the media server can provide a subscription-based media streaming service, for which a client device or user can have an associated account and credentials, and which enable the user's client device to communicate with and receive content from the media server. A received media-access request from a client device can include information such as, for example, a network address, which identifies a destination client device to which the media server should stream or otherwise provide media content, in response to processing the media-access request.

For example, a user may own several client devices, such as a smartphone and an audio speaker, which can play media content received from a media server. In accordance with an embodiment, identifying information provided with a media-access request can include an identifier, such as an IP address, MAC address, or device name, which identifies that the media-access request is intended for use with a particular destination device. This allows a user, for example, to use their smartphone as a controlling client device, and their audio speaker as a controlled client device to which media content should be sent. The media server can then send the requested media and/or forward the media-access request to the audio speaker, even though the request originated at the user's smartphone.

In accordance with an embodiment, a media application interface 148 can receive requests from client devices, or from other systems, to retrieve media content from the media server. A context database 162 can store data associated with the presentation of media content by a client device, including, for example, a current position within a media stream that is being presented by the client device, or a playlist associated with the media stream, or one or more previously-indicated user playback preferences. The media server can transmit context information associated with a media stream to a client device that is presenting that stream, so that the context information can be used by the client device, and/or displayed to the user. The context database can be used to store a media device's current media state at the media server, and synchronize that state between devices, in a cloud-like manner. Alternatively, media state can be shared in a peer-to-peer manner, wherein each device is aware of its own current media state which is then synchronized with other devices as needed.

For example, in accordance with an embodiment, when the destination client device to which the media content is being streamed changes, from a controlling device to a controlled device, or from a first controlled device to a second controlled device, then the media server can transmit context information associated with an active media content to the newly-appointed destination device, for use by that device in playing the media content.

In accordance with an embodiment, a media content database 164 can include media content, for example music, songs, videos, movies, or other media content, together with metadata describing that media content. The metadata can be used to enable users and client devices to search within repositories of media content, to locate particular media content items.

In accordance with an embodiment, a buffering logic 180 can be used to retrieve or otherwise access media content items, in response to requests from client devices or other systems, and to populate a server-side media content buffer 181, at a media delivery component/streaming service 152, with streams 182, 184, 186 of corresponding media content data, which can then be returned to the requesting device or to a controlled device.

In accordance with an embodiment, a plurality of client devices, media server systems, and/or controlled devices, can communicate with one another using a network, for example the Internet 190, a local area network, peer-to-peer connection, wireless or cellular network, or other form of network. For example, a user 192 can interact 194 with the user interface at a client device, and issue requests to access media content, for example the playing of a selected music or video item at their client device or at a controlled device, or the streaming of a media channel or video stream to their client device or to a controlled device.

In accordance with an embodiment, the user's selection of a particular media option can be communicated 196 to the media server, via the server's media application interface. The media server can populate its media content buffer at the server 204, with corresponding media content, 206 including one or more streams of media content data, and can then communicate 208 the selected media content to the user's client device, or to the controlled device as appropriate, where it can be buffered in a media content buffer for playing at the device.

In accordance with an embodiment, and as further described below, the system can include a server-side media gateway or access point 220, or other process or component, which operates as a load balancer in providing access to one or more servers, for use in processing requests at those servers. The system can enable communication between a client device and a server via an access point at the server, and optionally the use of one or more routers, to allow requests from the client device to be processed either at that server and/or at other servers.

For example, in a Spotify media content environment, most Spotify clients connect to various Spotify back-end processes via a Spotify "accesspoint", which forwards client requests to other servers, such as sending one or more metadataproxy requests to one of several metadataproxy machines on behalf of the client or end user.

Figure 2:
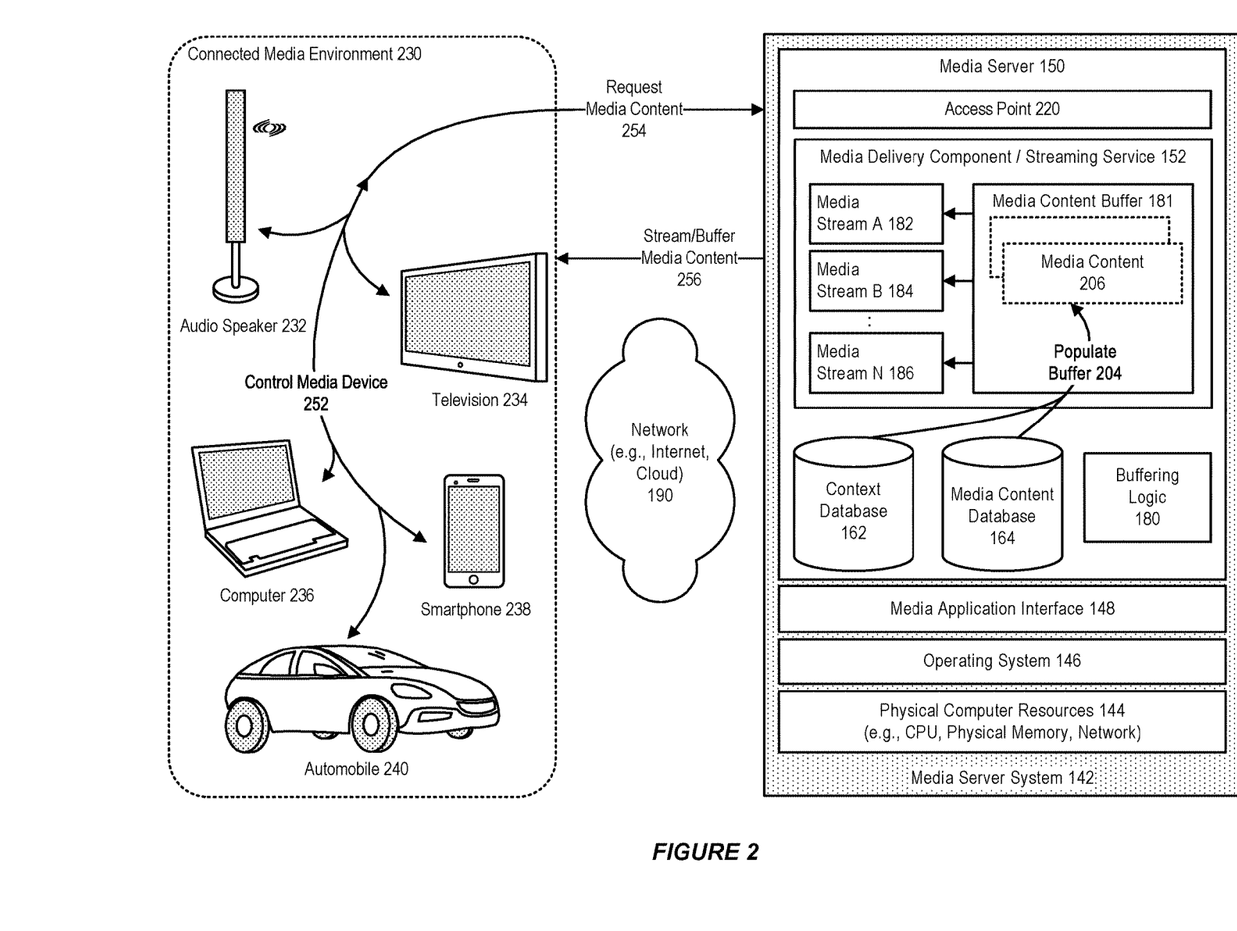
FIG. 2 further illustrates an example of a system for providing media content, in accordance with an embodiment.

FIG. 2 further illustrates an example of a system for providing media content, in accordance with an embodiment.

As illustrated in FIG. 2, in accordance with an embodiment, a connected media environment 230, for example a Spotify Connect environment, enables communication between a client device and the server-side access point in a connected manner from the perspective of a user. Examples of the types of media device that can be provided within a connected media environment include audio speakers 232, televisions 234, computers 236, smartphones 238, and in-car entertainment systems 240, or other types of media device.

In accordance with an embodiment, a client device having an application user interface can act as a controlling client device, to control 252 the playback of media content at a controlled device. In accordance with an embodiment, a client device can itself act as a media gateway or access point, for use by other devices within the system for providing media content.

In accordance with an embodiment, a controlled device can also include a media application, which in the case of an audio speaker, television or similar device can be included within the device itself as firmware logic, or within, for example, a separate set-top box or similar after-market device.

As described above, in accordance with an embodiment, a user can interact with the user interface at a client device, and issue requests to access media content, for example the playing of a selected music or video item at their client device or at a controlled device, or the streaming of a media channel or video stream to their client device or to a controlled device.

For example, in accordance with an embodiment, a user can request that media content be buffered, streamed or received and played at a controlling client device such as a smartphone, and simultaneously buffered, streamed or received for playing at one or more controlled devices, such as an audio speaker. Similarly, for example, the user can issue a media-change request 254 to change a media channel, in response to which the media server can switch the media channel at the controlled device, and thereafter continue to stream or buffer media content 256 for the switched channel, at the controlled device.

As described above, in some instances, a portion of the media content can be pre-buffered at the controlled device, so that the switching to the channel at the controlled device operates in a seamless manner.

Figure 3:
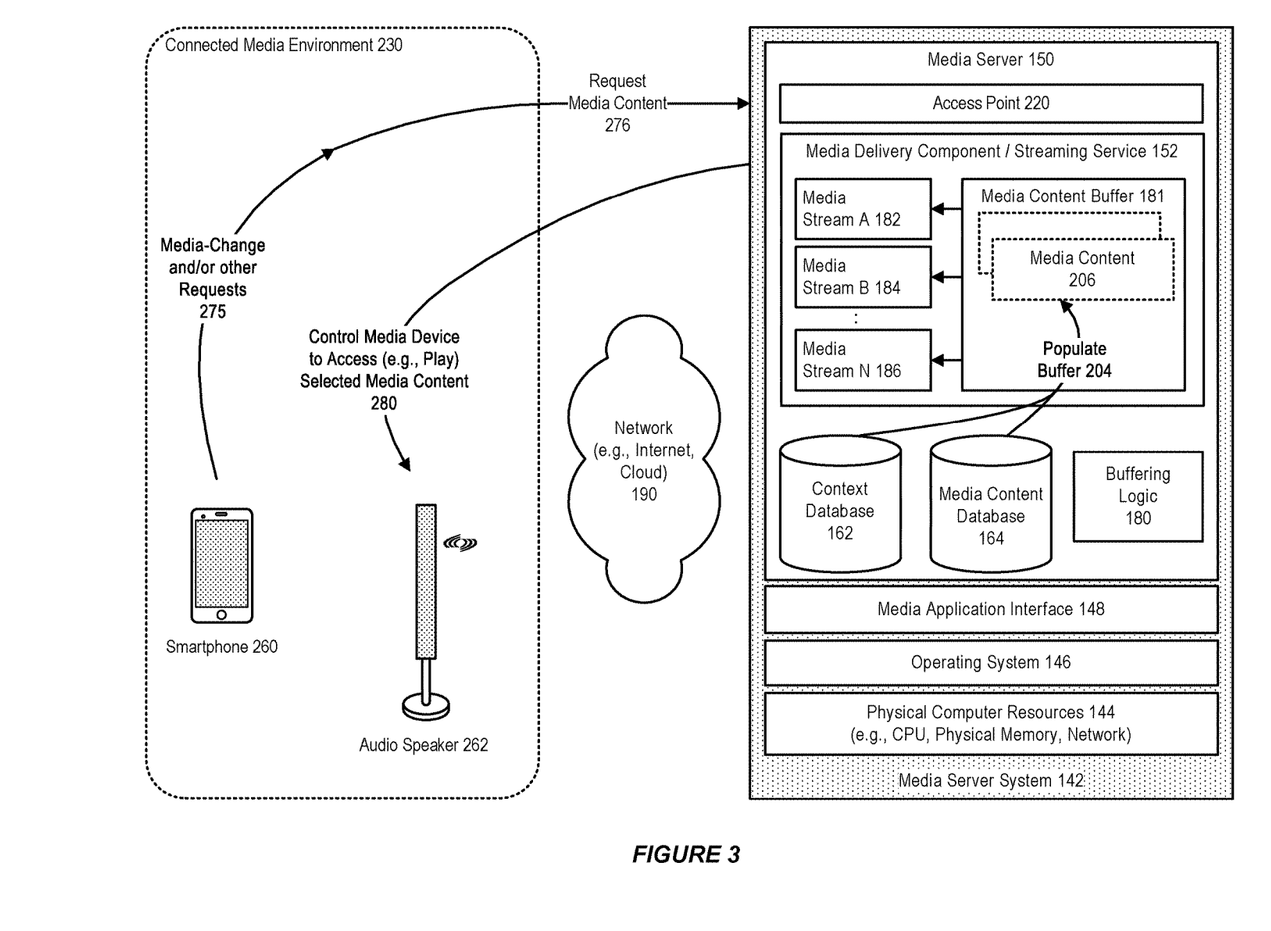
FIG. 3 further illustrates an example of a system for providing media content, in accordance with an embodiment.

FIG. 3 further illustrates an example of a system for providing media content, in accordance with an embodiment.

As illustrated in FIG. 3, a user can utilize, for example, a smartphone 260 in combination with an audio speaker 262, to issue a media-change request 275 from the smartphone, for example, to change a media channel at the audio speaker. The request can be received by the media gateway or access point, and communicated to the local media server, or to other media servers, as a request for media content 276, which can then respond by controlling the destination device (in this example, the audio speaker) to access (e.g., play) the selected media content 280.

Expected Latency Selection

In accordance with an embodiment, requests from clients can be distributed or load balanced to servers based on expected latency selection, for use in providing media content or other types of data.

For example, the system can be provided within a media server environment, such as the exemplary Spotify environment described above, to enable a streaming service to stream music to client devices, while at the backend using a determination of expected latency to distribute requests from those clients to appropriate metadata servers, metadata proxy servers, or other servers as appropriate, for use in processing the requests.

Although described herein in the context of load balancing of requests to servers based on expected latency, the techniques can be similarly applied to the load balancing of requests to any type of computer, processor, computing machine, or other processing machine, device, or component, each of which are generally referred to herein as a "server".

Figure 4:
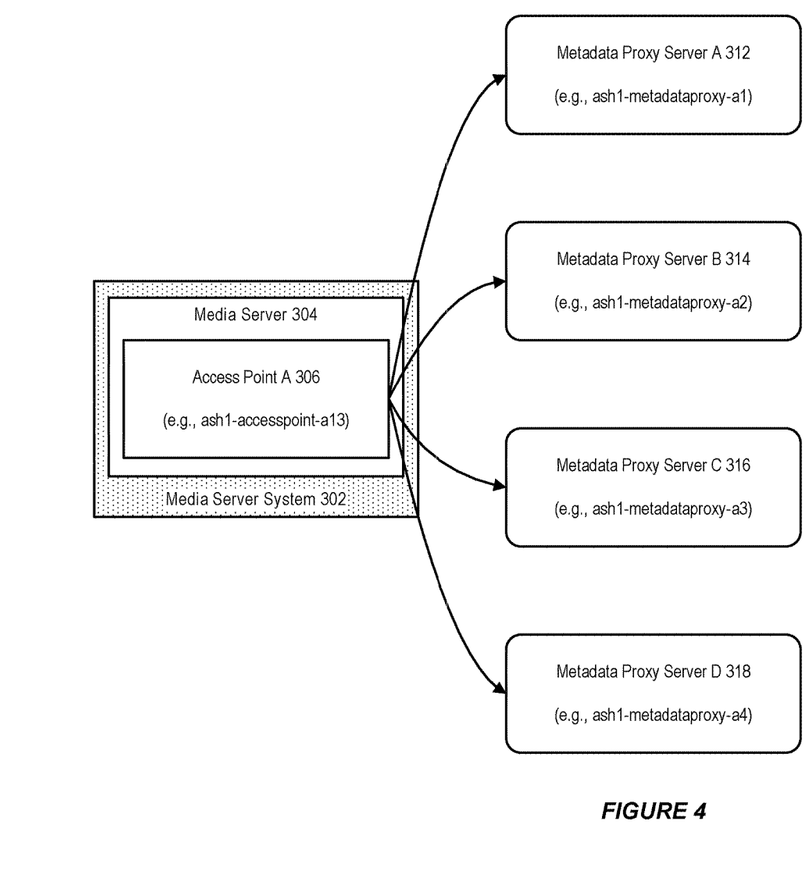
FIG. 4 illustrates an example of a round-robin load balancing strategy, in accordance with an exemplary embodiment.

FIG. 4 illustrates an example of a round-robin load balancing strategy, in accordance with an exemplary embodiment.

As illustrated in FIG. 4, in this example, a media server system 302 includes a media server 304, and an access point 306, which distributes or load balances requests to a plurality of metadata proxy servers 312, 314, 316, 318, as may be used in a media server environment.

A round-robin load balancing strategy distributes the load to the servers as follows: 1, 2, 3, 4, 1, 2, 3, 4, 1, and so on. However, a problem with this type of strategy is that slower servers receive the same load as faster servers, which will eventually lead to backups at those slower servers.

To address this, a join-the-shortest-queue (JSQ) strategy can be employed, which sends each received request to a server with the lowest number of currently-outstanding requests (i.e., requests that have not yet returned because they are either on their way to the server, are currently being processed by the server, or are on their way back from the server).

In many situations, a JSQ strategy performs better than a round-robin strategy. However, JSQ generally performs worse than round-robin when servers are failing fast, since those servers may answer quickly, albeit with a failed reply, so their job queue is generally short and this allows them to receive the most traffic.

The above-described problems presented by round-robin and JSQ strategies can be alleviated by the use of circuit breakers which act as proxies to other servers.

Figure 5:
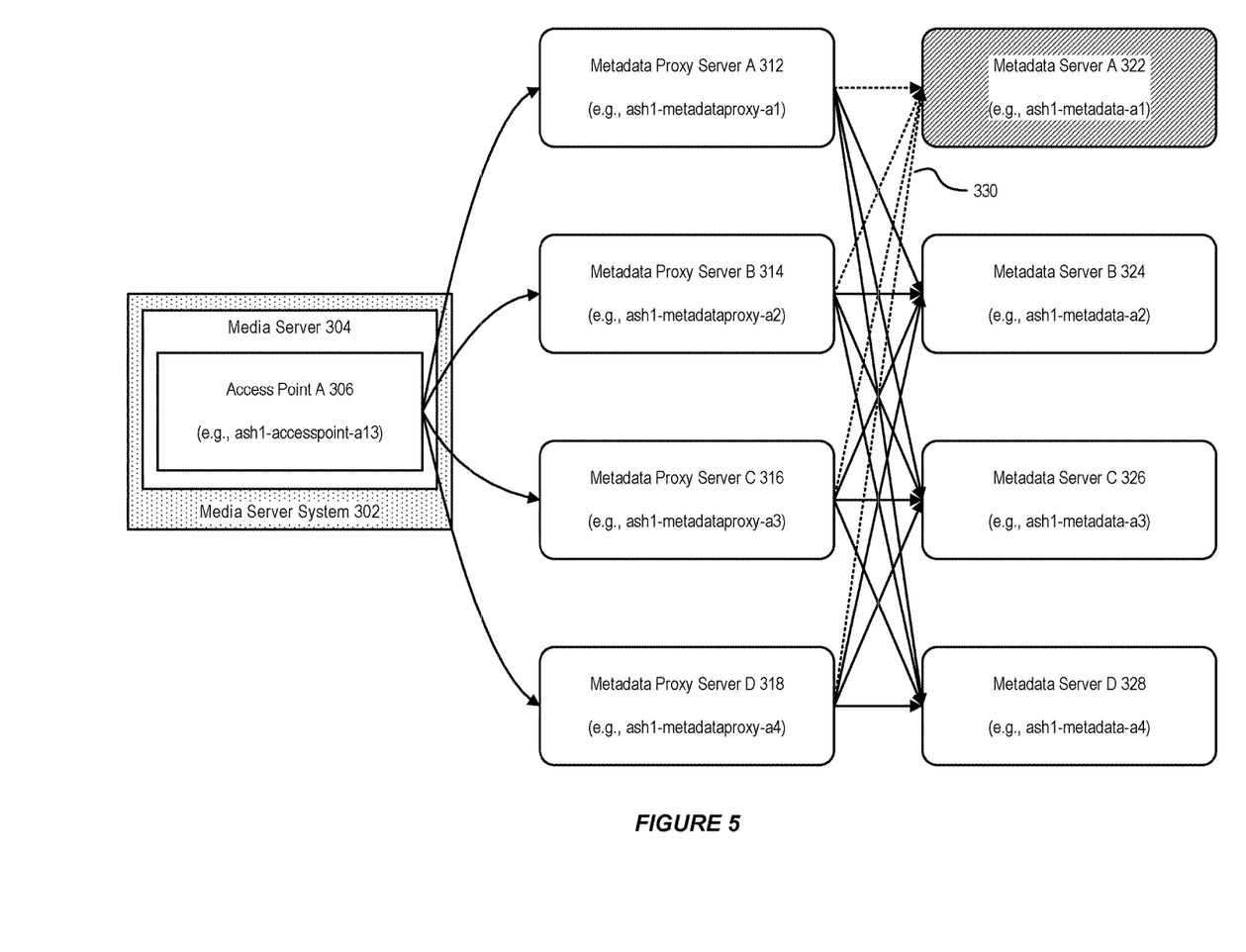
FIG. 5 illustrates the use of circuit breakers, in accordance with an exemplary embodiment.

FIG. 5 illustrates the use of circuit breakers, in accordance with an exemplary embodiment.

Generally described, a circuit breaker can be used to monitor the latency and failure rate of various servers, and remove a server from rotation if that server's latency or failure rate is too high. Servers can be added back into the rotation if their metrics improve.

As illustrated in FIG. 5, a plurality of metadata proxy servers as described above can be configured to act as circuit breakers to a plurality of metadata servers 322, 324, 326, 328. However, if a circuit breaker is not configured appropriately, then problems can arise. For example, in the situation illustrated, if one of the metadata servers is down (e.g., 322), such that it cannot receive requests (as indicated by dotted lines 330), then the entire group of metadataproxy servers may be indicated as currently having a 75% success rate. If the success rate threshold for the circuit breaker is set to 80%, then the entire metadataproxy service may be shut down, even though it may be operating at 75% of capacity.

As such, when circuit breakers are employed, there should be sufficient confidence in the measured metrics: for example, if a decision is to be based on the previous 10 requests, and 3 of those requests have failed, then there is a risk that a circuit breaker with a threshold of 80% would be triggered, even though its previous 1000 requests may have been successful.

To address this, in accordance with an embodiment, an expected latency selection or expected latency selector (ELS) can be used, which enables the system to distribute or load balance requests to servers based on a determination of expected latency at those servers. Generally described, expected latency selection operates as a probabilistic load balancer, in which each server or associated endpoint has a weight associated therewith. A server having a weight that is twice as high as another server, will correspondingly receive twice as much traffic as that other server.

In accordance with an embodiment, expected latency selection measures the success latency l and success rate s of each server; the number of outstanding requests q between a load balancer and a server; and, since fast failures are more useful than slow failures, the failure latency f for each server.

The end user experience is considerably impacted by latency, so those servers that are expected to answer quicker are generally preferred from a client's perspective. Expected latency selection therefore tries to ensure that slower servers receive less traffic, and that failing servers receive much less traffic. Slower and/or failing servers will generally still receive some amount of traffic, to enable the system to detect if and when those servers come back up again.

In accordance with an embodiment, expected latency selection can be used to provide a relative circuit breaker functionality that does not have the problems described above. For example, an ELS-equipped circuit breaker can remove a server from rotation if it is performing badly relative to a global average. Considering the example described above, in which four servers are collectively failing 25% of traffic, then a relative circuit breaker will not trigger in this case; instead a server would have to perform substantially worse than 75% for that particular server to be excluded.

Experimentally, an expected latency selection strategy can be shown to provide a high level of performance, generally matching JSQ strategies in benchmarks with non-failing servers, and outperforming JSQ strategies in those situations when servers fail.

Figure 6:
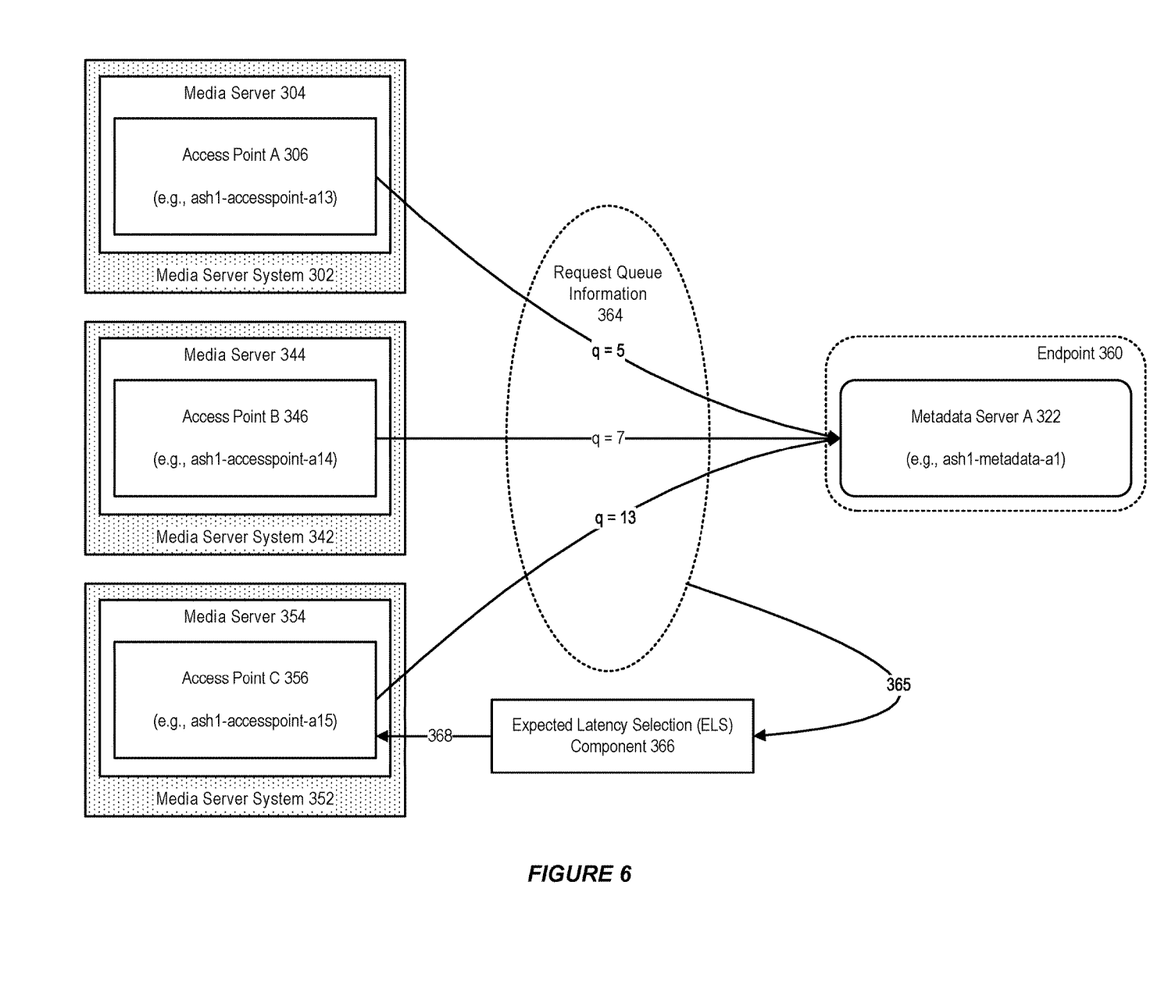
FIG. 6 illustrates an exemplary environment that can use expected latency selection, in accordance with an embodiment.

FIG. 6 illustrates an exemplary environment that can use expected latency selection, in accordance with an embodiment.

In accordance with an embodiment, the following terms or data are used in describing the process of expected latency selection:

l Success latency of a particular server
s Success rate of a particular server
q Outstanding number of requests for a particular server
f Failure latency for a particular server
L Expected latency of a successful response
E Expected user-oriented latency (wait time)
p Indication of parallelism of a particular server
W Weight of endpoint associated with a particular server In accordance with an embodiment, q indicates the number of outstanding requests that have been sent from a load balancer (e.g., an access point or other process) to a server, for which no reply has yet been received, and can be monitored as an integer.

In accordance with an embodiment, p provides an indication of parallelism. For example, some servers may have a larger number of processors, or higher-performing memory, allowing those servers to process more requests in parallel than lesser-equipped servers. In some instances it can be more useful to measure an amount of parallelism, and not simply rely on the number of processors reported by a server, since those processors may be occupied by other processes and not available for use with a particular service of interest.

In accordance with an embodiment, only locally observable information is used. For example, other load balancers may be sending requests to the same server, but those requests are not taken into account when calculating the number of outstanding request for a particular server. Sharing the number of outstanding requests between different load balancers may be useful in some instances, but generally requires higher code complexity. Additionally, when a load balancer broadcasts its load information to others, that information almost immediately becomes obsolete and of little use.

Additionally, when expected latency selection is employed in an already-existing environment, e.g., a Spotify media server, then the use of only locally observable information on a load balancing server reduces the need to modify the large number of backend Spotify services, in order to support the functioning on the load balancer.

In accordance with an embodiment, the system can use an exponentially moving weighted average in calculating expected latency, based on forward exponential decay, as described, for example in "Forward Decay: A Practical Time Decay Model for Streaming Systems" by Graham Cormode, Vladislav Shkapenyuk, Divesh Srivastava, and Bojian Xu; Proceedings of the 2009 IEEE International Conference on Data Engineering (ICDE '09); IEEE Computer Society, Washington, D.C., USA; 138-149, which is herein incorporated by reference.

With such a technique, the exponential decay of a value is determined by a time bias parameter. For example, when the time bias is set to 1 minute, since the weight is decreasing exponentially with each passing minute, then historical data older than t minutes would have a weight $1/\exp(-t)$. Since $1-1/\exp(1)=0.632$, this means that about 63.2% of a particular data value is determined by the most recent (last) minute of measurement, with 23.3% of the data value determined from the minute before that, and so on.

If the time bias is set too low, then measurements will be overly noisy; if set too high, then the load balancer may not readily detect a sudden increase in latency. To address this problem, the system can optionally be configured to adapt the time bias to a current rate of traffic. For example, an administrator can set a desired rate, and the load balancer will ensure that each server is expected to receive that many requests within a single time bias window.

As described above, an important consideration in any server environment is the expected latency from a client's (i.e., user's) perspective. For example, consider a server that has a success rate of 50%. With a probability of ½ then request processing with that server generally requires a first retry, whereas with a probability ¼ then request processing generally requires a second retry, and so on. In total, this means that $1+½+¼+⅛+1/16+\ldots=2$ tries are likely to be required for one successful response.

Since on average, one request fails and one succeeds, it is expected that a client will wait l+f ms for a successful response. In general, a success rate s leads to 1/s tries on average.

In accordance with an embodiment, the system can also take into account the failure roundtrip time to a client, when the client retries after a failure. For example, if one assumes a somewhat pessimistic perspective of a client on the other side of the world, with a poor quality Internet or network connection, then the time penalty for a failure roundtrip may be of the order of 800 milliseconds (ms).

Using this example then, the expected arrival time or latency of a successful response for this particular client, assuming there are no other requests waiting to be processed, would be (e.g., in ms):

$$L=l+(f+800)*(1/s-1)$$

For services that trigger many additional requests downstream, even one bad or slow reply may cause additional problems, and this may not be completely reflected in the above formula. Assuming a single processor, with q outstanding requests, the expected user-oriented latency (wait time) would be, for a particular reply, since there are q+1 requests to process in total (e.g., in ms):

$$E=L*(q+1)$$

Alternatively, with p processors, the expected user-oriented latency (wait time) would be:

$$E=L*(q/p+1)$$

As described above, instead of the number of processors, an amount of parallelism, as observed by the load balancer (e.g., access point or other component) could be used; however, parallelism may already be accounted for in many situations inasmuch as the queue size decreases faster for highly parallel servers.

Conversion of Expected Latency to Weights

As described above, in accordance with an embodiment, each server or associated endpoint has a weight associated therewith, with a server having a weight that is twice as high as another server correspondingly receiving twice as much traffic as that other server.

For example, consider an exemplary environment which includes three single-core servers with latencies of 10 ms, 20 ms, and 50 ms respectively, which implies that the three servers can handle, respectively 100, 50 or 20 requests per second. In such an environment, it makes sense to distribute traffic using a ratio 10:5:2, in proportion to the server speeds. Since the load balancer is probabilistic, a 7.2 times higher weight will means 7.2 times higher chance of receiving a request.

In accordance with an embodiment, the weight associated with an endpoint or server can be determined as:

$$W=1/E$$

wherein E is the computed expected latency:

$$E=L*(q+1)=(f+(f+800)*(1/s-1))*(q+1)$$

The lower the latency, the higher the likely processing speed, and the higher the weight awarded the endpoint or server. The optimal proportion is different when the system is not saturated: when the traffic is very low, then the fastest server might be able to handle all of the traffic by itself. However, such an approach would generally require sharing of load information between servers, which may be undesirable for the reasons described above.

In accordance with an embodiment, an alternative type of formulation, as described, for example, in "C3: Cutting Tail Latency in Cloud Data Stores via Adaptive Replica Selection" by Lalith Suresh, Marco Canini, Stefan Schmid, and Anja Feldmann; Proceedings of the 12th USENIX Symposium on Networked Systems Design and Implementation (NSDI '15); USENIX Association; 513-537, which is herein incorporated by reference, can be used to further improve tail latency, so that the weight associated with an endpoint or server can alternatively be determined as:

$$W=1/L*(q+1)^3$$

This (third power) type of formulation generally leads to better tail latency, since it operates to penalize servers that have too many outstanding requests.

After a request is received, data values indicative of l, s, f and q are updated. When a request is sent, the data value indicative of q is increased. The weight associated with an endpoint or server can then be updated to:

$$W=1+(l+800)*(1/s-1))*(q+1)^3$$

The weight can be thereafter updated on a continual basis. During request processing, for example when the load balancer (e.g., an access point or other component) receives a request from a client, an endpoint or server can be chosen randomly in proportion to its determined weight. For example, with two endpoints having weights 10 and 100, the latter has 10 times higher chance of being selected to process the request.

As illustrated in FIG. 6, the above technique can be employed with one or more server systems (302, 342, 352), each having a media server (304, 344, 354) and access point (306, 346, 356), to provide access to, in this example, a metadata server associated with an endpoint 360, by taking into account the request queue information 364 between each media server and the metadata server, and providing 365 that information to an expected latency selection component 366, for use 368 by each access point in making its determinations.

Figure 7:
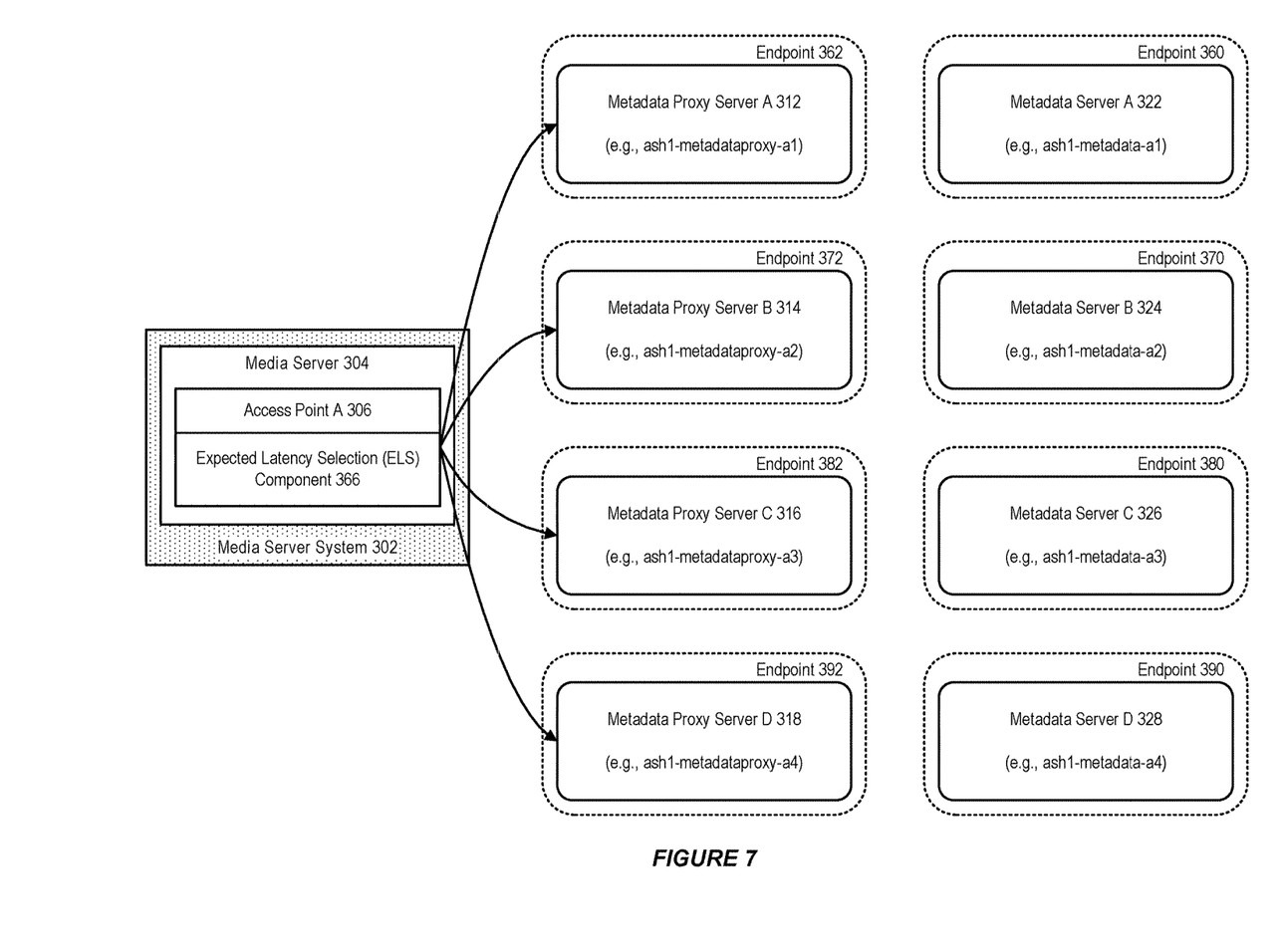
FIG. 7 illustrates an exemplary use of expected latency selection with a plurality of servers, in accordance with an embodiment.

FIG. 7 illustrates an exemplary use of expected latency selection with a plurality of servers, in accordance with an embodiment. As illustrated in FIG. 7, in the example shown, each of a plurality of metadata proxy servers and metadata servers can be associated with an endpoint 360, 362, 370, 372, 380, 382, 390, 392 particular to that server.

Figure 8:
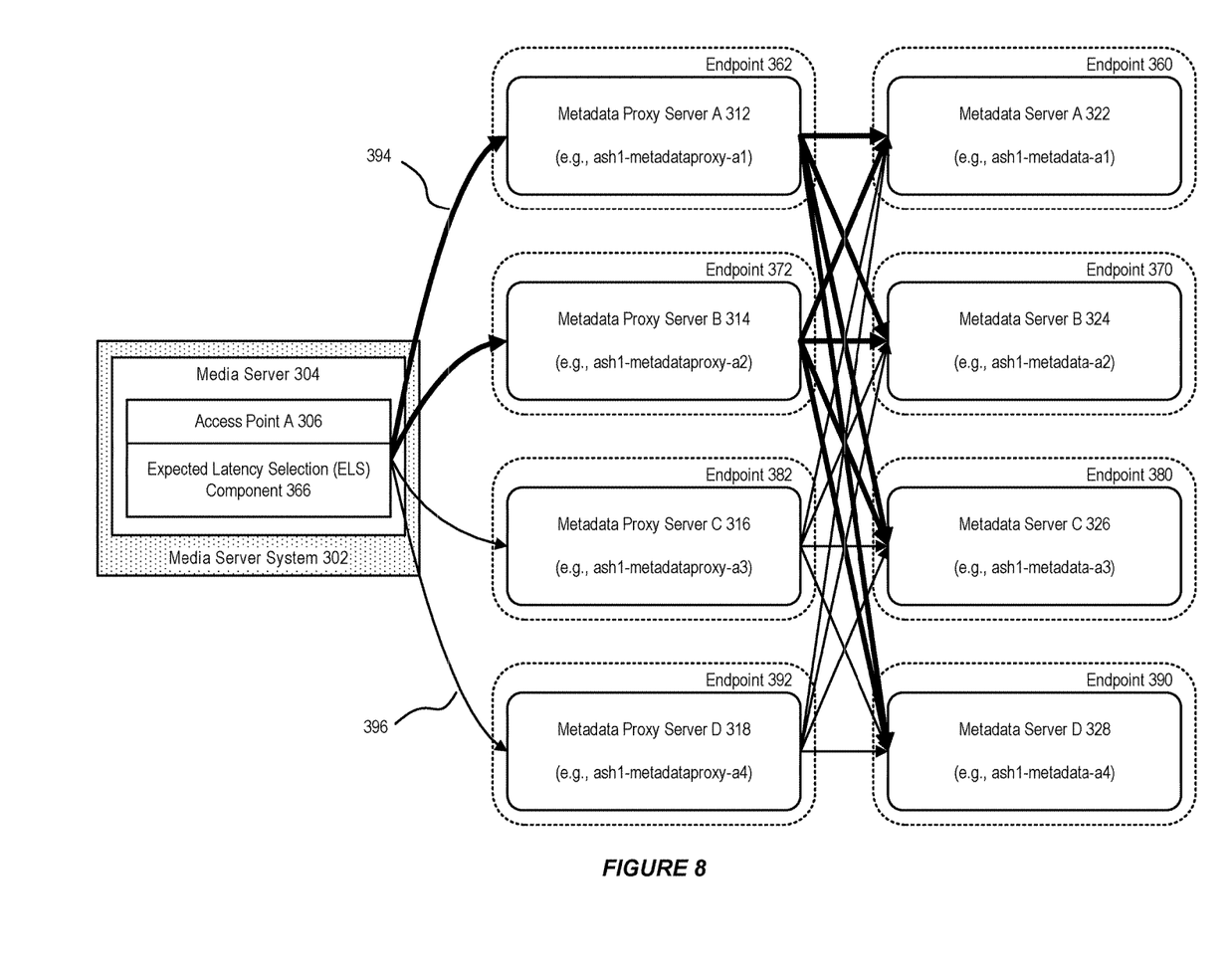
FIG. 8 further illustrates an exemplary use of expected latency selection with a plurality of servers, in accordance with an embodiment.

FIG. 8 further illustrates an exemplary use of expected latency selection with a plurality of servers, in accordance with an embodiment. As illustrated in FIG. 8, an access point or other process can use expected latency selection to determine the weights of particular endpoints and to distribute or load balance requests accordingly, including for example that selected servers will receive more requests based on their expected latency (indicated as the bold lines 394), while other servers will receive less requests based on their expected latency (indicated as lines 396).

In accordance with an embodiment, the system can support parallel thread processing, wherein the load balancer uses parallelism so that requests are processed in different threads, and weights for the endpoints are also calculated in different threads. After a weight calculation, a lock is acquired and the weight is updated for the endpoint in a common array of weights. After the update, the lock is released.

Figure 9:
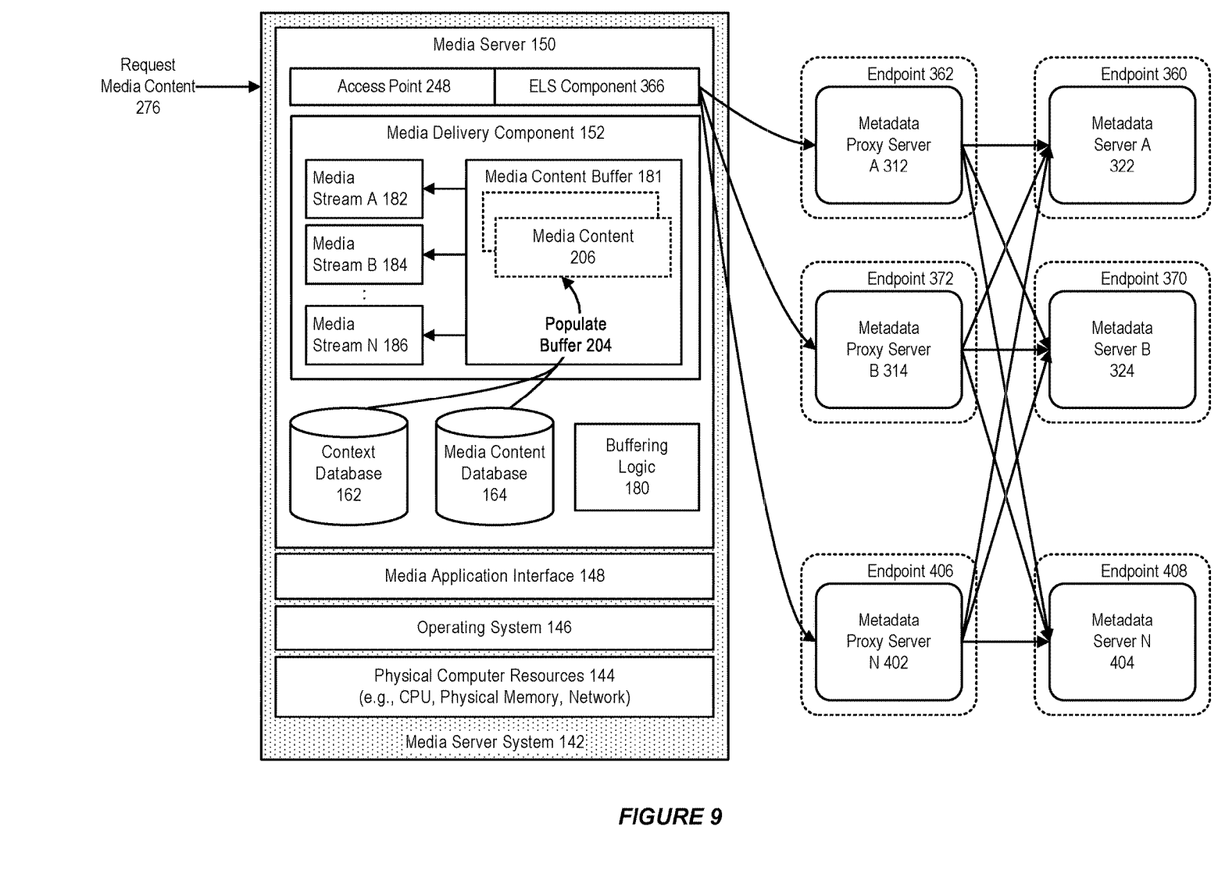
FIG. 9 illustrates the use of expected latency selection with a system for providing media content, in accordance with an embodiment.

FIG. 9 illustrates the use of expected latency selection with a system for providing media content, in accordance with an embodiment. As illustrated in FIG. 9, a media server such as that described above, and including an access point equipped with an expected latency selection component, can call upon other servers as appropriate, including in this example metadata proxy server N 402, and metadata server N 400, each of which can be associated with endpoints 406, 408 respectively.

Figure 10:
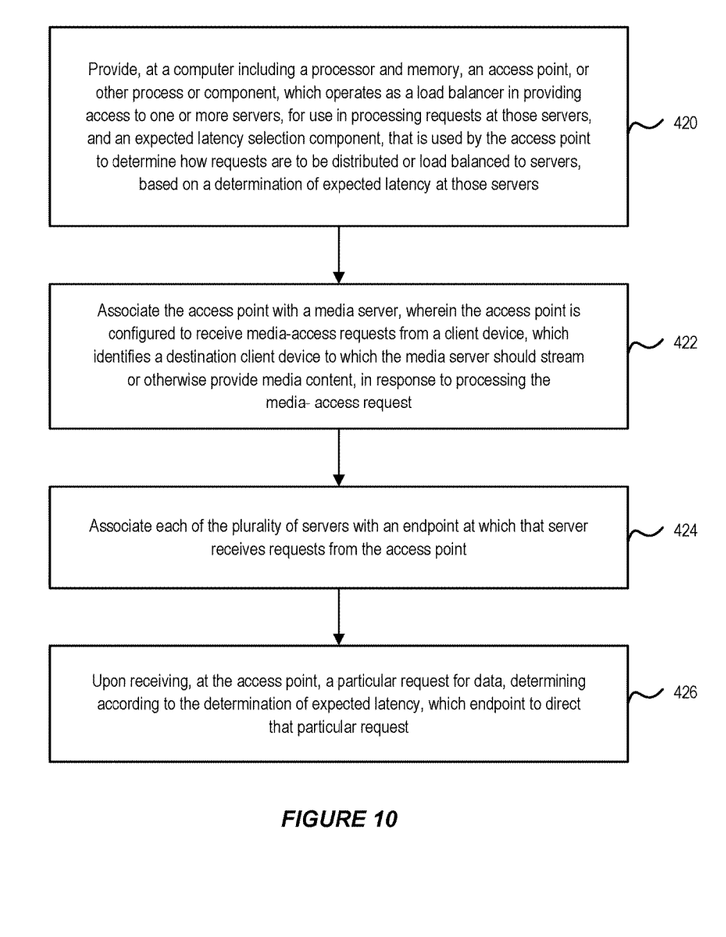
FIG. 10 is a flowchart that illustrates a process for use of expected latency selection, in accordance with an embodiment.

FIG. 10 is a flowchart that illustrates a process for use of expected latency selection, in accordance with an embodiment.

As shown in FIG. 10, at step 420, the process includes providing, at a computer including a processor and memory, an access point, or other process or component, which operates as a load balancer in providing access to one or more servers, for use in processing requests at those servers, and an expected latency selection component, that is used by the access point to determine how requests are to be distributed or load balanced to servers, based on a determination of expected latency at those servers.

At step 422, the access point is associated with a media server, wherein the access point is configured to receive media-access requests from a client device, which identifies a destination client device to which the media server should stream or otherwise provide media content, in response to processing the media-access request.

At step 424, each of the plurality of servers are associated with an endpoint at which that server receives requests from the access point.

At step 426, upon receiving, at the access point, a particular request for data, the system determines according to the determination of expected latency, which endpoint to direct that particular request.

Embodiments of the present invention may be conveniently implemented using one or more conventional general purpose or specialized digital computer, computing device, server, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art.

For example, while the techniques described above generally illustrate exemplary uses in media content environments, or music streaming services such as Spotify, for use in providing streamed music or other media content, the systems and techniques described herein can be similarly used with other types of systems, and/or for providing other types of data.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for selection of servers based on expected latency, comprising:
   a computer including a processor and memory;
   an access point that operates on the computer as a load balancer to provide access to a plurality of servers, for use in processing requests at the plurality of servers;
   an expected latency selection component, that is used by the access point to determine a distribution of the requests to the plurality of servers, based on a determination of expected latency at the plurality of servers, wherein the expected latency is determined based on measurement, for each server of the plurality of servers able to receive requests from the access point, data indicative of success latency, success rate, amount of outstanding requests, and failure latency for that server;

wherein each server of the plurality of servers is associated with an endpoint at which that server receives requests from the access point; and whereupon the access point receiving a particular request for data, the determination of expected latency at the plurality of servers is used to determine a particular endpoint associated with a particular server to direct the particular request.

2. The system of claim 1, comprising a media server, wherein the access point is configured to receive media-access requests from a client device, which identifies a destination client device to which the media server should provide media content, in response to processing the media-access request.

3. The system of claim 2, wherein each of the plurality of servers is one of a media content metadata server, or a proxy media content metadata server, for use in providing the media content to the destination client device.

4. The system of claim 1, wherein a data indicative of failure roundtrip time is additionally used by the expected latency selection component in the determination of expected latency at the plurality of servers.

5. The system of claim 1, wherein the expected latency selection component determines a weight associated with each of the plurality of servers able to receive requests, for use in directing traffic to the servers in accordance with their weights.

6. The system of claim 1, wherein the expected latency selection component removes a server from rotation if its expected latency is below a certain threshold.

7. A method for selection of servers based on expected latency, comprising:
providing, at a computer including a processor and memory,
an access point that operates on the computer as a load balancer in providing access to a plurality of servers, for use in processing requests at the plurality of servers, and
an expected latency selection component, that is used by the access point to determine a distribution of the requests to the plurality of servers, based on a determination of expected latency at the plurality of servers, wherein the expected latency is determined based on measuring, for each server of the plurality of servers able to receive requests from the access point, data indicative of success latency, success rate, amount of outstanding requests, and failure latency for that server;
associating each server of the plurality of servers with an endpoint at which that server receives requests from the access point; and
upon receiving, at the access point, a particular request for data, determining according to the determination of expected latency at the plurality of servers, a particular endpoint associated with a particular server to direct the particular request.

8. The method of claim 7, further comprising providing a media server, wherein the access point is configured to receive media-access requests from a client device, which identifies a destination client device to which the media server should provide media content, in response to processing the media-access request.

9. The method of claim 8, wherein each of the plurality of servers is one of a media content metadata server, or a proxy media content metadata server, for use in providing the media content to the destination client device.

10. The method of claim 7, wherein an indication of failure roundtrip time is additionally used by the expected latency selection component in the determination of expected latency at the plurality of servers.

11. The method of claim 7, wherein the expected latency selection component determines a weight associated with each of the plurality of servers able to receive requests, for use in directing traffic to the servers in accordance with their weights.

12. The method of claim 7, wherein the expected latency selection component removes a server from rotation if its expected latency is below a certain threshold.

13. A non-transitory computer readable storage medium, including instructions stored thereon which when read and executed by one or more computers cause the one or more computers to perform the steps comprising:
performing, at a computer including a processor and memory, a process which
operates as a load balancer in providing access to a plurality of servers, for use in processing requests at the plurality of servers, and
determines a distribution of the requests to the plurality of servers, based on a determination of expected latency at the plurality of servers, wherein the expected latency is determined based on measuring, for each server of the plurality of servers able to receive requests, data indicative of success latency, success rate, amount of outstanding requests, and failure latency for that server;
associating each server of the plurality of servers with an endpoint at which that server receives requests; and
upon receiving a particular request for data, determining according to the determination of expected latency at the plurality of servers, a particular endpoint associated with a particular server to direct the particular request.

14. The non-transitory computer readable storage medium of claim 13, further comprising providing a media server, wherein the process is configured to receive media-access requests from a client device, which identifies a destination client device to which the media server should provide media content, in response to processing the media-access request.

15. The non-transitory computer readable storage medium of claim 14, wherein each of the plurality of servers is one of a media content metadata server, or a proxy media content metadata server, for use in providing the media content to the destination client device.

16. The non-transitory computer readable storage medium of claim 13, wherein an indication of failure roundtrip time is additionally used by the process in the determination of expected latency at the plurality of servers.

17. The non-transitory computer readable storage medium of claim 13, wherein the process determines a weight associated with each of the plurality of servers able to receive requests, for use in directing traffic to the servers in accordance with their weights.

* * * * *